United States Patent
Yang et al.

(10) Patent No.: US 12,221,348 B2
(45) Date of Patent: Feb. 11, 2025

(54) THERMALLY EXPANDED REDUCED GRAPHENE OXIDE, MANUFACTURING METHOD THEREFOR, SULFUR-CARBON COMPOSITE COMPRISING SAME, AND LITHIUM SECONDARY BATTERY

(71) Applicant: LG CHEM, LTD., Seoul (KR)

(72) Inventors: Seungbo Yang, Daejeon (KR); Kwonnam Sohn, Daejeon (KR); Suenghoon Han, Daejeon (KR); Jangsoo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 966 days.

(21) Appl. No.: 17/281,455

(22) PCT Filed: Nov. 8, 2019

(86) PCT No.: PCT/KR2019/015142
§ 371 (c)(1),
(2) Date: Mar. 30, 2021

(87) PCT Pub. No.: WO2020/101276
PCT Pub. Date: May 22, 2020

(65) Prior Publication Data
US 2022/0002158 A1    Jan. 6, 2022

(30) Foreign Application Priority Data

Nov. 14, 2018  (KR) .................. 10-2018-0139662
Nov. 7, 2019   (KR) .................. 10-2019-0141399

(51) Int. Cl.
*C01B 32/198*   (2017.01)
*C01B 32/194*   (2017.01)
(Continued)

(52) U.S. Cl.
CPC .......... *C01B 32/198* (2017.08); *C01B 32/194* (2017.08); *H01M 4/364* (2013.01);
(Continued)

(58) Field of Classification Search
None
See application file for complete search history.

(56) References Cited

U.S. PATENT DOCUMENTS

2019/0245203 A1   8/2019   Cho et al.
2021/0226207 A1   7/2021   Cheng

FOREIGN PATENT DOCUMENTS

JP    2013-214503 A    10/2013
KR    10-2016-0039926 A    4/2016
(Continued)

OTHER PUBLICATIONS

Machine translation of KR 20180024915, Mar. 2018.*
(Continued)

*Primary Examiner* — Jonathan Crepeau
(74) *Attorney, Agent, or Firm* — Birch, Stewart, Kolasch & Birch, LLP (57) ABSTRACT

A holey thermally expanded-reduced graphene oxide having high specific surface area and pore volume including pores on the surface, a method for preparing the same, and a sulfur-carbon composite and a lithium secondary battery including the same.

14 Claims, 3 Drawing Sheets

(51) Int. Cl.
*H01M 4/36* (2006.01)
*H01M 4/38* (2006.01)
*H01M 4/583* (2010.01)
*H01M 10/052* (2010.01)

(52) U.S. Cl.
CPC .............. *H01M 4/38* (2013.01); *H01M 4/583* (2013.01); *H01M 10/052* (2013.01); *C01P 2004/64* (2013.01); *C01P 2006/12* (2013.01); *C01P 2006/14* (2013.01); *C01P 2006/16* (2013.01)

(56) References Cited

FOREIGN PATENT DOCUMENTS

| KR | 10-2017-0088156 A | 8/2017 |
| KR | 10-2017-0136147 A | 12/2017 |
| KR | 10-1832663 B1 | 2/2018 |
| KR | 10-2018-0024915 A | 3/2018 |
| KR | 10-2018-0057360 A | 5/2018 |
| KR | 10-2018-0066615 A | 6/2018 |
| WO | WO 2017/217408 A1 | 12/2017 |
| WO | WO 2018/084449 A2 | 5/2018 |

OTHER PUBLICATIONS

International Search Report for PCT/KR2019/015142 mailed on Feb. 19, 2020.
Extended European Search Report for European Application No. 19884515.8, dated Oct. 20, 2021.
Zhou et al., "Facile synthesis of holey graphene-supported Pt catalysts for direct methanol electro-oxidation," Microporous and Mesoporous Materials, vol. 247, 2017, pp. 116-123.

* cited by examiner

THERMALLY EXPANDED REDUCED GRAPHENE OXIDE, MANUFACTURING METHOD THEREFOR, SULFUR-CARBON COMPOSITE COMPRISING SAME, AND LITHIUM SECONDARY BATTERY

TECHNICAL FIELD

This application claims the benefits of priorities based on Korean Patent Application No. 10-2018-0139662 filed on Nov. 14, 2018, and Korean Patent Application No. 10-2019-0141399 filed on Nov. 7, 2019, the entire contents of which are incorporated herein by reference.

The present invention relates to holey thermally expanded-reduced graphene oxide, a method for preparing the same, and a sulfur-carbon composite and a lithium secondary battery including the same.

BACKGROUND ART

Graphitic carbon materials including fullerene, carbon nanotubes, and graphene as a nanomaterial formed only with carbon atoms have received attention academically and industrially due to their excellent electric properties, and physical and chemical stability.

Particularly, graphene is a material that has been spotlighted as an innovative new material due to its very high specific surface area with respect to volume, excellent electric conductivity, and physical and chemical stability. Among carbon materials, graphene may be mass produced through chemical oxidation, exfoliation, and chemical or thermal reduction treatment using natural or synthetic graphite that is abundant and inexpensive as a raw material, and the manufacturing method is disclosed.

Meanwhile, in recent few years, surface functionalization through surface activation and doping has been conducted to compensate for insufficient properties of carbon materials used in electrodes for secondary batteries, super capacitors or environmental adsorbents, or to induce effects of enhancing performance.

However, when synthesizing a microparticle structure using existing carbon materials, controlling uniform density, size, shape and composition through controlling a condition is difficult, and a complicated synthesis process is resulted. Thus, development of functionalized carbon structures capable of resolving such problems and obtaining through a simple synthesis process has been required.

Meanwhile, among secondary batteries, a lithium-sulfur battery has theoretical energy density of approximately 2600 Wh/kg, which is a high value corresponding to approximately 7 times of a lithium ion battery having energy density of approximately 570 Wh/kg. In addition, sulfur used as a positive electrode material of a lithium-sulfur battery is inexpensive by being abundant in resources, and has an advantage of lowering battery manufacturing costs. Due to such advantages, a lithium-sulfur battery has received much attention.

Despite such advantages, lithium polysulfide limiting a lifetime of the lithium-sulfur battery is produced as an intermediate during an electrochemical reaction of a lithium-sulfur battery. Lithium polysulfide produced during an electrochemical reaction of a lithium-sulfur battery has high solubility for an organic electrolyte liquid, and is continuously dissolved in an organic electrolyte liquid during a discharge reaction. Accordingly, the amount of a positive electrode material including sulfur decreases causing a problem of reducing a lifetime of the battery itself. In addition, since sulfur itself has very low electric conductivity, sulfur may not be used alone as a positive electrode material, and technologies of either preparing as a composite together with a conductive material such as conductive carbon and polymer, or coating these with sulfur are essential. As described above, sulfur is not able to be used alone as a positive electrode active material, and other conductive materials other than sulfur are included causing a problem of decreasing energy density of the whole cell. In view of such a problem, the sulfur content needs to be maximized in a positive electrode material while the conductive material content needs to be minimized, and the sulfur needs to be evenly supported on the conductive material.

Extensive studies have been continuously required in order to resolve the above-described problems.

PRIOR ART DOCUMENTS

Patent Document

Korean Patent Application Publication No. 10-2018-0057360

DISCLOSURE

Technical Problem

The inventors of the present invention have identified that, when graphene oxide is expanded and reduced by heat treatment, and then steam activated, a content of sulfur supported on the graphene oxide may increase by increasing the specific surface area and the pore volume, and the sulfur may be evenly supported on the surface and the inside. In addition, the inventors of the present invention have identified that, by forming several nm size pores on the surface, lithium ions and electrons of a battery are readily transported, which may enhance discharge capacity in a high rate section, and have completed the present invention.

Accordingly, an aspect of the present invention provides holey thermally expanded-reduced graphene oxide (holey TE-rGO) having high specific surface area and pore volume and including several nm size pores, and a method for preparing the same.

Another aspect of the present invention provides a sulfur-carbon composite including the holey thermally expanded-reduced graphene oxide including pores on the surface, and sulfur, and a lithium secondary battery including the same as a positive electrode active material.

Technical Solution

In order to achieve the above objects, the present invention provides holey thermally expanded-reduced graphene oxide including pores on the surface, wherein the surface pores have an average size of 0.5 nm to 4 nm.

The present invention also provides a method for preparing holey thermally expanded-reduced graphene oxide, the method including (a) thermally expanding graphene oxide by heat treatment; (b) reducing the thermally expanded graphene oxide by heat treatment; and (c) forming pores on the surface by steam activating the thermally expanded-reduced graphene oxide.

The present invention also provides a sulfur-carbon composite including the holey thermally expanded-reduced graphene oxide including pores on the surface of the present invention; and sulfur on at least a part of the surface pores, inner pores and surface of the holey thermally expanded-reduced graphene oxide including pores on the surface.

The present invention also provides a lithium secondary battery including a positive electrode; a negative electrode; a separator interposed between the positive electrode and the negative electrode; and an electrolyte liquid, wherein the positive electrode includes the sulfur-carbon composite of the present invention.

Advantageous Effects

By having high specific surface area and pore volume, holey thermally expanded-reduced graphene oxide having pores formed on the surface of the present invention is capable of not only supporting a large amount of sulfur, but also evenly supporting the sulfur.

Accordingly, a lithium secondary battery including a sulfur-carbon composite including sulfur on at least a part of the surface pores, inner pores and surface of the holey thermally expanded-reduced graphene oxide having pores formed on the surface as a positive electrode active material is capable of exhibiting excellent initial discharge capacity by enhancing sulfur reactivity.

In addition, by the holey thermally expanded-reduced graphene oxide having pores formed on the surface of the present invention including several nm size pores on the surface, a lithium secondary battery including a sulfur-carbon composite including sulfur on at least a part of the surface pores, inner pores and surface of the holey thermally expanded-reduced graphene oxide having pores formed on the surface as a positive electrode active material is capable of enhancing discharge capacity of the battery in a high rate section by improving lithium ion and electron transport abilities.

BEST MODE

Hereinafter, the present invention will be described in more detail.

Holey Thermally Expanded-Reduced Graphene Oxide Including Pores on Surface

The present invention relates to holey thermally expanded-reduced graphene oxide including pores on the surface, wherein an average size of the surface pores of the holey thermally expanded-reduced graphene oxide (holey TE-rGO) is from 0.5 nm to 4 nm.

The holey thermally expanded-reduced graphene oxide including pores on the surface may be prepared by preparing thermally expanded graphene oxide by heat treating graphene oxide, preparing thermally expanded-reduced graphene oxide (TE-rGO) by reducing the thermally expanded graphene oxide by conducting heat treatment again, and then conducting a steam activation process on the TE-rGO.

In the present invention, graphene oxide prepared by going through steps of thermal expansion, reduction and steam activation as above is defined as holey thermally expanded-reduced graphene oxide including pores on the surface (holey TE-rGO).

The holey thermally expanded-reduced graphene oxide including pores on the surface includes pores on the inside as well as on the surface, and an average size of the pores formed on the surface may be from 0.5 nm to 4 nm and preferably from 0.5 nm to 2 nm.

The holey thermally expanded-reduced graphene oxide including pores on the surface includes 0.5 nm to 4 nm size pores on the surface, and by using the same as a positive electrode active material of a lithium secondary battery, enhanced discharge capacity may be obtained in a high rate section by enhancing lithium ion and electron transport properties.

Existing reduced graphene oxide has a two-dimensional structure, and, when using the same as a positive electrode active material of a battery, there is a problem in that initial charge of a battery is not complete since lithium ion transport is limited. However, by providing holey thermally expanded-reduced graphene oxide including pores on the surface, the present invention is capable of resolving the above-described problem by enhancing lithium ion transport properties due to the surface pores.

In addition, higher specific surface area and pore volume may be obtained compared to thermally expanded-reduced graphene oxide not including the above-mentioned size pores on the surface.

Specifically, the holey thermally expanded-reduced graphene oxide including pores on the surface of the present invention may have a specific surface area of 500 $m^2/g$ to 2500 $m^2/g$ and preferably 1000 $m^2/g$ to 2500 $m^2/g$, and a pore volume of 3 $cm^3/g$ to 12 $cm^3/g$ and preferably 7 $cm^3/g$ to 12 $cm^3/g$.

In the present invention, the holey thermally expanded-reduced graphene oxide including pores on the surface may be used as a carrier capable of supporting sulfur, and by having the above-mentioned specific surface area and pore volume, a larger amount of sulfur may be supported, and the sulfur may be evenly supported on the surface pores, the inner pores and the surface.

When the amount of supported sulfur is too small in a sulfur-carbon composite having sulfur supported on at least a part of inside and surface of a carbon material, the carbon material ratio increases in the sulfur-carbon composite decreasing energy density of a battery. In addition, when sulfur is not evenly supported, the carbon material surface is covered by sulfur causing a problem of reducing electric conductivity of the sulfur-carbon composite.

However, the sulfur-carbon composite having sulfur supported on at least a part of the surface pores, inner pores and surface of the holey thermally expanded-reduced graphene oxide including pores on the surface is capable of evenly supporting a large amount of sulfur due to high specific surface area and pore volume of the holey thermally expanded-reduced graphene oxide including pores on the surface, and as a result, excellent initial discharge capacity and lifetime properties may be obtained by enhancing reactivity of a lithium secondary battery using the same as a positive electrode active material.

In addition, when the specific surface area is from 500 $m^2/g$ to 2500 $m^2/g$, a large amount of sulfur may be evenly supported on the holey thermally expanded-reduced graphene oxide including pores on the surface.

When the pore volume is from 3 $cm^3/g$ to 12 $cm^3/g$, a large amount of sulfur may be evenly supported on the holey thermally expanded-reduced graphene oxide including pores on the surface.

The holey thermally expanded-reduced graphene oxide including pores on the surface of the present invention may have a crumpled paper structure by being prepared through steps of thermal expansion and reduction, and may have 0.5 nm to 4 nm size pores formed on the surface through a steam activation step.

By having the crumpled paper structure and the above-mentioned size surface pores, high specific surface area and pore volume as above may be obtained, and as a result, enhanced discharge capacity may be obtained in a high rate section by enhancing sulfur reactivity and enhancing lithium ion and electron transport properties.

A ratio between carbon and oxygen is generally about 1:1 in graphene oxide, however, by reduction, the ratio between carbon and oxygen changes to approximately 9:1 in reduced graphene oxide. The reduced graphene oxide (rGO) is not thermally expanded and thereby does not have a crumpled paper structure. The reduced graphene oxide has a stacking structure by reduction, and the oxygen functional group has approximately 3% by weight to 5% by weight due to chemical reduction.

On the other hand, the thermally expanded-reduced graphene oxide has a crumpled paper structure as the oxygen functional group on the reduced graphene oxide surface is removed by thermal expansion. Specifically, the thermally expanded-reduced graphene oxide has the oxygen functional group of the graphene oxide removed by thermal shock due to thermal expansion, and has a crumpled paper structure by including the oxygen functional group in approximately 10% by weight or less, and therefore, may have higher specific surface area and pore volume compared to the reduced graphene oxide. In other words, a crumpled paper structure is obtained when thermally expanding reduced graphene oxide, and by increasing a surface area, a surface area increased to approximately less than 100 $m^2/g$, or to approximately 900 $m^2/g$ may be obtained when measuring the surface area by BET. However, since the thermally expanded-reduced graphene oxide does not include 0.5 nm to 4 nm pores on the surface, the holey thermally expanded-reduced graphene oxide including pores on the surface of the present invention may have most superior specific surface area and pore volume.

Method for Preparing Holey Thermally Expanded-Reduced Graphene Oxide Including Pores on Surface In addition, the present invention relates to a method for preparing holey thermally expanded-reduced graphene oxide including pores on the surface (holey TE-rGO), and the method includes
(a) thermally expanding graphene oxide by heat treatment;
(b) reducing the thermally expanded graphene oxide by heat treatment; and
(c) forming pores on the surface by steam activating the thermally expanded-reduced graphene oxide.

The step (a) is a step of thermally expanding graphene oxide by heat treatment.

By conducting the heat treatment, the oxygen functional group of the graphene oxide is readily removed, and the graphene oxide may be readily thermally expanded. When the graphene oxide is thermally expanded, the oxygen functional group of the graphene oxide is removed by thermal shock, and an expanded crumpled paper structure may be obtained.

The graphene oxide may be a powder type.

Since film-type graphene oxide has a stacked structure, thermally expanded-reduced graphene oxide having a target specific surface area may not be obtained. Accordingly, powder-type graphene oxide is preferably used in the present invention.

In addition, the heat treatment may be conducted for 5 minutes to 30 minutes at a temperature of 300° C. to 500° C., and may be preferably conducted for 5 minutes to 15 minutes at a temperature of 350° C. to 450° C.

When the heat treatment temperature and time are less than the above-mentioned ranges, the graphene oxide is not sufficiently thermally expanded, and when greater than the above-mentioned ranges, the yield may be reduced.

The step (b) is a step of reducing the thermally expanded graphene oxide prepared in the step (a) by heat treatment.

By conducting further heat treatment in the step (b), a reduction process of the thermally expanded graphene oxide occurs, and as a result, thermally expanded-reduced graphene oxide having a crumpled paper structure may be finally obtained.

In addition, the heat treatment may be conducted for 1 hour to 5 hours at a temperature of 700° C. to 1200° C., and may preferably be conducted for 2 hours to 4 hours at a temperature of 800° C. to 1000° C.

When the heat treatment temperature and time are less than the above-mentioned ranges, thermally expanded graphene oxide is not sufficiently thermally expanded failing to obtain a high specific surface area, and when greater than the above-mentioned ranges, the yield may be reduced.

The thermally expanded-reduced graphene oxide has a crumpled paper structure after going through the steps of thermal expansion and reduction.

The step (c) is a step of preparing holey thermally expanded-reduced graphene oxide including pores on the surface by forming pores on the surface through steam activating the thermally expanded-reduced graphene oxide prepared in the step (b).

By steam activating the thermally expanded-reduced graphene oxide in the step (c), pores having an average size of 0.5 nm to 4 nm may be formed on the surface of the thermally expanded-reduced graphene oxide, and as a result, holey thermally expanded-reduced graphene oxide including pores on the surface may be prepared.

In the steam activation process, pores may be formed on the surface of the thermally expanded-reduced graphene oxide by the reaction of $H_2O+C \rightarrow H_2+CO$.

The holey thermally expanded-reduced graphene oxide including pores on the surface also includes pores on the inside.

The steam activation may be conducted for 30 minutes to 3 hours at a temperature of 500° C. to 1000° C., and may be preferably conducted for 30 minutes to 2 hours at a temperature of 700° C. to 900° C.

When the steam activation temperature and time are less than the above-mentioned ranges, pores are not sufficiently formed on the surface of the holey thermally expanded graphene oxide including pores on the surface unable to enhance lithium ion transport properties, and as a result, initial charge may not be complete in a battery using the same as a positive electrode active material. When greater than the above-mentioned ranges, too many pores are formed on the surface destroying the structure of the reduced graphene oxide.

The thermally expanded-reduced graphene oxide (TE-rGO) prepared in the step (b) may exhibit high specific surface area and pore volume by having a crumpled paper structure after going through the steps of thermal expansion and reduction. By steam activating the thermally expanded-reduced graphene oxide through the step (c) in the present invention, holey thermally expanded-reduced graphene oxide including pores on the surface (holey TE-rGO) including pores having an average size of 0.5 nm to 4 nm on the surface is prepared, and higher specific surface area and pore volume may be obtained compared to the thermally expanded-reduced graphene oxide prepared in the step (b).

More specifically, the thermally expanded-reduced graphene oxide (TE-rGO) prepared in the step (b) may have a specific surface area of 400 $m^2/g$ to less than 1000 $m^2/g$, and a pore volume of 3 $cm^3/g$ to less than 7 $cm^3/g$.

However, the holey thermally expanded-reduced graphene oxide including pores on the surface (holey TE-rGO) prepared in the step (c) may have a specific surface area of 500 $m^2/g$ to 2500 $m^2/g$ and preferably 1000 $m^2/g$ to 2500 $m^2/g$, and a pore volume of 3 $cm^3/g$ to 12 $cm^3/g$ and preferably 7 $cm^3/g$ to 12 $cm^3/g$.

When the specific surface area is from 500 $m^2/g$ to 2500 $m^2/g$, a large amount of sulfur may be evenly supported on the holey thermally expanded-reduced graphene oxide.

When the pore volume is from 3 $cm^3/g$ to 12 $cm^3/g$, a large amount of sulfur may be evenly supported on the holey thermally expanded-reduced graphene oxide.

The holey thermally expanded-reduced graphene oxide including pores on the surface prepared using the preparation method of the present invention may be used as a carrier capable of supporting sulfur, and by having high specific surface area and pore volume, a large amount of sulfur may be evenly supported. Accordingly, a sulfur-carbon composite having sulfur supported on at least a part of the surface pores, inner pores and surface of the holey thermally expanded-reduced graphene oxide including pores on the surface is capable of evenly supporting a large amount of sulfur, and as a result, excellent initial discharge capacity and lifetime properties may be obtained by enhancing reactivity of a lithium secondary battery using the same as a positive electrode active material.

In addition, by the holey thermally expanded-reduced graphene oxide including pores on the surface including 0.5 nm to 4 nm size pores on the surface, enhanced discharge capacity may be obtained in a high rate section by enhancing lithium ion and electron transport properties.

Sulfur-Carbon Composite

The present invention relates to a sulfur-carbon composite including holey thermally expanded-reduced graphene oxide including pores on the surface; and sulfur on at least a part of the surface pores, inner pores and surface of the holey thermally expanded-reduced graphene oxide including pores on the surface.

The holey thermally expanded-reduced graphene oxide including pores on the surface is the same as described above, and may be prepared using the preparation method described above.

The sulfur may be one or more types selected from the group consisting of elemental sulfur ($S_8$), organosulfur compounds $Li_2S_n$ (n≥1) and carbon-sulfur polymers (($C_2S_x)_n$: x=2.5 to 50, n≥2). Preferably, inorganic sulfur ($S_8$) may be used.

In the sulfur-carbon composite according to the present invention, the holey thermally expanded-reduced graphene oxide including pores on the surface and the sulfur are preferably mixed in a weight ratio of 1:1 to 1:9. When the content of the holey thermally expanded-reduced graphene oxide including pores on the surface is greater than the above-mentioned range, the content of sulfur, an active material, decreases causing a problem in securing battery capacity, and when the content is less than the above-mentioned range, the content of the holey thermally expanded-reduced graphene oxide including pores on the surface is not enough to provide electric conductivity, and therefore, the content is properly adjusted in the above-mentioned range.

The method of compositing the sulfur-carbon composite of the present invention is not particularly limited in the present invention, and methods commonly used in the art may be used. As one example, a method of simply mixing the holey thermally expanded-reduced graphene oxide including pores on the surface of the present invention and sulfur, and then heat treating the result for compositing may be used.

The sulfur is supported on at least a part of the surface pores, inner pores and surface of the holey thermally expanded-reduced graphene oxide including pores on the surface, and a larger amount of sulfur is supported on the surface pores and the inner pores than the surface.

The diameter of the sulfur-carbon composite of the present invention is not particularly limited and may vary, however, the diameter may be preferably from 0.1 μm to 20 μm and more preferably from 1 μm to 10 μm. When satisfying the above-mentioned range, a high loading electrode may be prepared.

The sulfur-carbon composite uses the holey thermally expanded-reduced graphene oxide including pores on the surface of the present invention as a carbon material, and therefore, a larger amount of sulfur may be evenly supported compared to existing reduced graphene oxide. Accordingly, a lithium secondary battery including the sulfur-carbon composite of the present invention may be effective in enhancing initial discharge capacity and lifetime properties.

Lithium Secondary Battery

The present invention relates to a lithium secondary battery including a positive electrode; a negative electrode; a separator interposed between the positive electrode and the negative electrode; and an electrolyte liquid, wherein the positive electrode includes the sulfur-carbon composite of the present invention as a positive electrode active material.

By including the sulfur-carbon composite as a positive electrode active material, the lithium secondary battery of the present invention may be a lithium-sulfur battery.

The positive electrode may include a positive electrode current collector, and a positive electrode active material layer coated on one surface or both surfaces of the positive electrode current collector.

The positive electrode current collector supports a positive electrode active material, and is not particularly limited as long as it has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with a positive electrode active material by forming micro unevenness on a surface thereof, and various forms such as films, sheets, foil, meshes, nets, porous bodies, foams or non-woven fabrics may be used.

The positive electrode active material layer may include a positive electrode active material, a binder and a conductor.

The positive electrode active material includes the sulfur-carbon composite of the present invention described above.

As described above, the carbon material of the sulfur-carbon composite is the holey thermally expanded-reduced graphene oxide including pores on the surface of the present invention, and, by having high specific surface area and pore volume, a larger amount of sulfur may be evenly supported. Accordingly, in the present invention, a loading amount of sulfur of the positive electrode may be from 2 mg/cm$^2$ to 15 mg/cm$^2$, and preferably from 6 mg/cm$^2$ to 10 mg/cm$^2$. By having such a high loading amount, the lithium secondary battery including the positive electrode may be effective in enhancing initial discharge capacity and lifetime properties.

In addition, by the holey thermally expanded-reduced graphene oxide including pores on the surface of the present invention including 0.5 nm to 4 nm size pores on the surface, enhanced discharge capacity may be obtained in a high rate section by enhancing lithium ion and electron transport properties.

The positive electrode may further include, in addition to the positive electrode active material, one or more additives selected from among transition metal elements, group IIIA elements, group IVA elements, sulfur compounds of these elements, and alloys of these elements and sulfur.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The conductor is for enhancing electric conductivity, and is not particularly limited as long as it is an electron conducting material not causing chemical changes in a lithium secondary battery.

Generally, carbon black, graphite, carbon fiber, carbon nanotubes, metallic powders, conductive metal oxides, organic conductors and the like may be used, and products currently commercially available as a conductor include acetylene black series (products of Chevron Chemical Company or Gulf Oil Company, and the like), Ketjen Black EC series (products of Armak Company), Vulcan XC-72 (products of Cabot Company), Super P (products of MMM) and the like. For example, acetylene black, carbon black, graphite and the like may be included.

In addition, the positive electrode active material may include a binder having functions of keeping the positive electrode active material on the positive electrode current collector, and connecting the active material. As the binder, various types of binders such as, for example, polyvinylidene fluoride-hexafluoropropylene (PVDF-co-HFP), polyvinylidene fluoride, (PVDF), polyacrylonitrile, polymethyl methacrylate, styrene-butadiene rubber (SBR) and carboxyl methyl cellulose (CMC) may be used.

Such a positive electrode may be prepared using a common method, and specifically, may be prepared by coating a composition for forming a positive electrode active material layer prepared in a slurry state by mixing the positive electrode active material, the conductor and the binder in an organic solvent on a current collector, drying the result, and selectively compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

The composition for forming a positive electrode active material layer may be coated on the positive electrode current collector using a method commonly known in the art, and for example, various methods such as a dipping method, a spray method, a roll coat method, a gravure printing method, a bar coat method, a die coating method, a comma coating method, a mixed method thereof, or the like may be used.

The positive electrode active material layer gone through such a coating process goes through a drying process thereafter, and as a result, evaporation of the solvent or the dispersion medium, compactness of the coating film, adhesion between the coating film and the current collector and the like are achieved. Herein, the drying is conducted using a common method, and is not particularly limited.

The negative electrode is a lithium-based metal, and may further include a current collector on one side of the lithium-based metal. As the current collector, a negative electrode current collector may be used.

The negative electrode current collector is not particularly limited as long as it has high conductivity without inducing chemical changes to the battery, and may be selected from the group consisting of copper, aluminum, stainless steel, zinc, titanium, silver, palladium, nickel, iron, chromium, alloys thereof and combinations thereof. The stainless steel may have its surface treated with carbon, nickel, titanium or silver, and as the alloy, aluminum-cadmium alloys may be used. In addition thereto, baked carbon, non-conductive polymers of which surface is treated with a conductor, conductive polymers or the like may also be used. A thin copper plate is generally used as the negative electrode current collector.

In addition, as the form, various forms such as films, sheets, foil, nets, porous bodies, foams or non-woven fabrics having micro unevenness formed/not formed on the surface may be used.

In addition, as the negative electrode current collector, those having a thickness range of 3 μm to 500 μm are used. When the negative electrode current collector thickness is less than 3 μm, a current collecting effect decreases, and the thickness being greater than 500 μm on the other hand may have a problem of reducing processability when assembling the cell through folding.

The lithium-based metal may be lithium or a lithium alloy. Herein, the lithium alloy includes elements capable of alloying with lithium, and specifically, may be an alloy of lithium and one or more types selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al.

The lithium-based metal may be a sheet- or foil-type, and, depending on cases, may be a type of lithium or lithium alloy being deposited or coated on the current collector using a dry process, or a type of particulate metal and alloy being deposited or coated using a wet process or the like.

A common separator may be interposed between the positive electrode and the negative electrode. The separator is not particularly limited as long as it is, as a physical separator having a function of physically separating electrodes, used as a common separator, and particularly, those having an excellent electrolyte liquid moisture retention ability while having low resistance for ion migration of the electrolyte liquid are preferred.

In addition, the separator enables lithium ion transport between the positive electrode and the negative electrode while separating or insulating the positive electrode and the negative electrode. Such a separator may be formed with porous non-conductive or insulating materials. The separator may be an independent member such as a film, or a coating layer added to the positive electrode and/or the negative electrode.

Examples of the polyolefin-based porous membrane that may be used as the separator may include membranes formed with a polyolefin-based polymer such as polyethylene such as high density polyethylene, linear low density polyethylene, low density polyethylene and ultra-high molecular weight polyethylene, polypropylene, polybutylene and polypentene alone, or a polymer mixing these.

Examples of the non-woven fabric that may be used as the separator may include non-woven fabrics formed with polyphenylene oxide, polyimide, polyamide, polycarbonate, polyethylene terephthalate, polyethylene naphthalate, polybutylene terephthalate, polyphenylene sulfide, polyacetal, polyethersulfone, polyetheretherketone, polyester and the like alone, or a polymer mixing these, and such a non-woven fabric has a fiber form forming a porous web, and includes spunbond or meltblown form formed with long fibers.

The thickness of the separator is not particularly limited, but is preferably in a range of 1 µm to 100 µm, and more preferably in a range of 5 µm to 50 µm. When the separator has a thickness of less than 1 µm, mechanical properties may not be maintained, and when the thickness is greater than 100 µm, the separator functions as a resistive layer declining battery performance.

A pore size and porosity of the separator are not particularly limited, however, the pore size is preferably from 0.1 µm to 50 µm, and the porosity is preferably from 10% to 95%. When the separator has a pore size of less than 0.1 µm or porosity of less than 10%, the separator functions as a resistive layer, and when the pore size is greater than 50 µm or the porosity is greater than 95%, mechanical properties may not be maintained.

The electrolyte liquid is a non-aqueous electrolyte containing a lithium salt, and is formed with a lithium salt and an electrolyte liquid. As the electrolyte liquid, a non-aqueous organic solvent, an organic solid electrolyte, an inorganic solid electrolyte and the like are used.

The lithium salt may be used without limit as long as it is commonly used in liquid electrolytes for a lithium-sulfur battery. Examples thereof may include one or more selected from the group consisting of LiSCN, LiBr, LiI, $LiPF_6$, $LiBF_4$, $LiB_nCl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, chloroborane lithium, lower aliphatic carboxylic acid lithium and the like.

In addition, the concentration of the lithium salt may be from 0.2 M to 2 M, specifically from 0.6 to 2 M and more specifically from 0.7 to 1.7 M in the electrolyte liquid. When the lithium salt concentration is used in less than 0.2 M, conductivity of the electrolyte liquid may decrease causing decline in the electrolyte liquid performance, and when the lithium salt concentration is used in greater than 2 M, viscosity of the electrolyte liquid increases leading to a decrease in the lithium ion mobility.

The non-aqueous organic solvent needs to favorably dissolve the lithium salt, and examples of the non-aqueous organic solvent of the present invention may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydrofuran, 2-methyl tetrahydrofuran, dimethyl sulfoxide, 1,3-dioxolane, 4-methyl-1,3-dioxane, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and the organic solvent may be used either alone or as a mixture of two or more organic solvents.

As the organic solid electrolyte, for example, polyethylene derivatives, polyethylene oxide derivatives, polypropylene oxide derivatives, phosphoric acid ester polymers, polyalginate lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH or $Li_3PO_4$—$Li_2S$—$SiS_2$ may be used.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the electrolyte of the present invention. In some cases, halogen-containing solvents such as carbon tetrachloride and trifluoroethylene may be further included in order to provide nonflammability, carbon dioxide gas may be further included in order to enhance high temperature storage properties, and fluoro-ethylene carbonate (FEC), propene sultone (PRS), fluoro-propylene carbonate (FPC) and the like may be further included.

The electrolyte may be used as a liquid electrolyte or as an electrolyte separator form in a solid state. When using as a liquid electrolyte, a separator formed with porous glass, plastics, ceramics or polymers is further included as a physical separator having a function of physically separating electrodes.

Hereinafter, preferred examples are provided in order to illuminate the present invention, however, the following examples are for illustrative purposes only, and it is obvious to those skilled in the art that various changes and modifications may be made within the category and technological ideas of the present invention, and such changes and modifications also fall within the scope of the attached claims.

Example 1. Preparation of Holey Thermally Expanded-Reduced Graphene Oxide Including Pores on Surface Thermally expanded graphene oxide was prepared by heat treating graphene oxide (GO, product name SE2430, The Sixth Element, Inc.) for 10 minutes at a temperature of 400° C. under the inert atmosphere.

The thermally expanded graphene oxide was heat treated for 3 hours at a temperature of 900° C. under the inert atmosphere to prepare thermally expanded-reduced graphene oxide (TE-rGO).

The thermally expanded-reduced graphene oxide (TE-rGO) was steam activated for 1 hour at a temperature of 700° C. to prepare holey thermally expanded-reduced graphene oxide having a crumpled paper structure and including pores on the surface (holey TE-rGO).

Example 2. Preparation of Holey Thermally Expanded-Reduced Graphene Oxide Including Pores on Surface Holey thermally expanded-reduced graphene oxide having a crumpled paper structure and including pores on the surface (holey TE-rGO) was prepared in the same manner as in Example 1 except that the steam activation was conducted for 20 minutes at a temperature of 300° C.

Comparative Example 1. Preparation of Thermally Expanded-Reduced Graphene Oxide

Thermally expanded graphene oxide was prepared by heat treating graphene oxide (GO, product name SE2430, The Sixth Element, Inc.) for 10 minutes at a temperature of 400° C. under the inert atmosphere.

Figure 1:
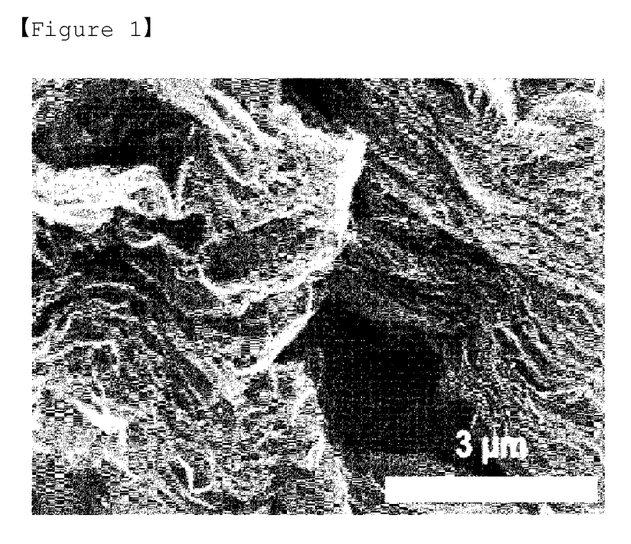
FIG. 1 is a SEM image of thermally expanded-reduced graphene oxide (TE-rGO) of Comparative Example 1.

The thermally expanded graphene oxide was heat treated for 3 hours at a temperature of 900° C. under the inert atmosphere to prepare thermally expanded-reduced graphene oxide (TE-rGO) having a crumpled paper structure (FIG. 1).

Figure 2:
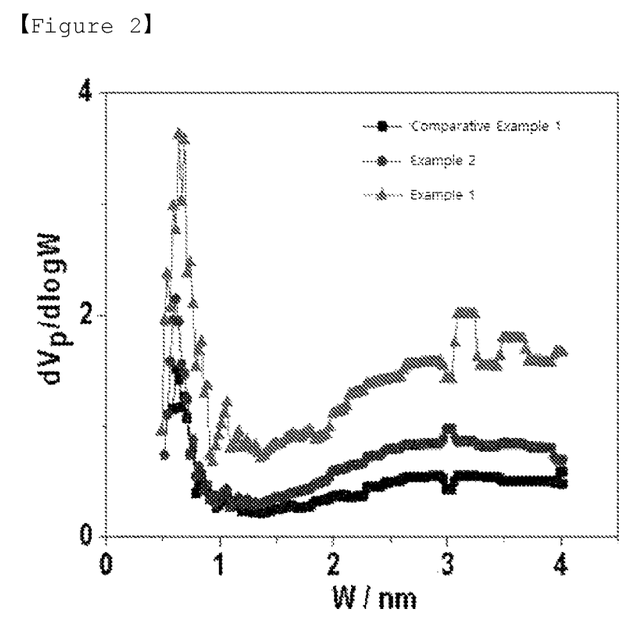
FIG. 2 is a graph measuring a pore volume depending on an average size of pores formed on the surface of holey thermally expanded-reduced graphene oxide including pores on the surface (holey TE-rGO) of Example 1 and Example 2, and thermally expanded-reduced graphene oxide (TE-rGO) of Comparative Example 1.
Figure 3:
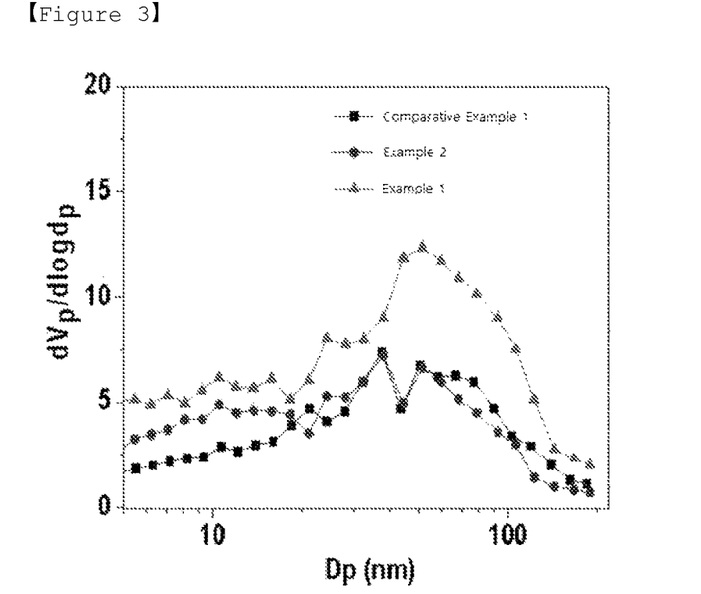
FIG. 3 is a graph measuring a pore volume depending on an average size of the surface and inner pores of holey thermally expanded-reduced graphene oxide including pores on the surface (holey TE-rGO) of Example 1 and Example 2, and thermally expanded-reduced graphene oxide (TE-rGO) of Comparative Example 1.

Experimental Example 1. Measurement of Surface Pore Volume of Thermally Expanded-Reduced Graphene Oxide Volumes of the pores formed on the surface of the holey TE-rGO prepared in Examples 1 to 2 and the surface of the TE-rGO prepared in Comparative Example 1 were measured. The volumes of the pores formed on the surface were measured with a Brunauer-Emmett-Teller (BET) 6 point method by a nitrogen gas adsorption distribution method using a porosimetry analyzer (Bell Japan Inc, Belsorp-II mini), and the results are shown in FIG. 2.

With the BET measurement, 0.5 nm to 2 nm size micropores, 2 nm to 50 nm size mesopores, and 50 nm to 200 nm size macropores may be measured.

As a result, the pores formed on the surface of the holey TE-rGO, Examples 1 and 2 of the present invention, had an average size of 0.5 nm to 4 nm, and particularly, the pore volume was measured to be high at 1 nm or less, and it was identified that pores having a size of 1 nm or less were much formed on the surface. However, it was identified that the holey TE-rGO of Example 1 conducting the steam activation at 500° C. to 1000° C. had more pores formed compared to the holey TE-rGO of Example 2 conducting the steam activation at 300° C., a temperature lower than the temperature range of Example 1. These results are shown in FIG. 2.

On the other hand, the TE-rGO of Comparative Example 1 had a very insignificant pore volume value measured at less than 2 nm, and it was difficult to decide that pores having a size of 0.5 nm to 4 nm were formed on the surface. This result is also shown in FIG. 2.

In other words, it was seen that pores of the TE-rGO increased through the steam activation process, and particularly, pores having a size of 0.5 nm to 4 nm increased on the TE-rGO surface.

Experimental Example 2. Measurement of Specific Surface Area, Pore Volume, and Average Pore Size of Thermally Expanded-Reduced Graphene Oxide Specific surface areas, pore volumes and average pore sizes of the holey TE-rGO prepared in Examples 1 to 2 and the TE-rGO prepared in Comparative Example 1 were measured with a Brunauer-Emmett-Teller (BET) 6 point method by a nitrogen gas adsorption distribution method using a porosimetry analyzer (Bell Japan Inc, Belsorp-II mini), and the results are shown in the following Table 1.

The pore volume and the average pore size mean volume and average size of the pores formed on the inside and the surface of the holey TE-rGO of Examples 1 to 2 and the TE-rGO of Comparative Example 1.

TABLE 1

|  | Specific Surface Area ($m^2/g$) | Pore Volume ($cm^3/g$) | Average Pore Size (nm) |
| --- | --- | --- | --- |
| Example 1 (Holey TE-rGO) | 2272 | 11.6 | 20.43 |
| Example 2 (Holey TE-rGO) | 1106 | 6.77 | 24.48 |
| Comparative Example 1 (TE-rGO) | 921 | 5.13 | 22.28 |

By including pores on the surface, the holey TE-rGO of Examples 1 and 2 exhibited higher specific surface area and pore volume compared to the TE-rGO of Comparative Example 1 not including pores on the surface. In addition, by including 0.5 nm to 4 nm size pores on the surface, the average pore sizes of the holey TE-rGO of Examples 1 and 2 was measured to be smaller than the average pore size of the TE-rGO of Comparative Example 1. However, from the results of Experimental Example 1, it was seen that the holey TE-rGO of Example 2 conducting steam activation at 300° C. had smaller specific surface area and pore volume, and a larger average pore size compared to the holey TE-rGO of Example 1 conducting steam activation at 500 to 1000° C. since the number of 0.5 nm to 4 nm size pores formed on the surface was smaller.

Accordingly, with the above-described specific surface area and pore volume, it was seen that the holey TE-rGO of the present invention was capable of evenly supporting a large amount of sulfur compared to the TE-rGO.

<Manufacture of Lithium-Sulfur Battery>

Example 3

After mixing the holey TE-rGO prepared in Example 1 and sulfur in a weight ratio of 3:7, the mixture was reacted for 35 minutes at a temperature of 155° C. to prepare a sulfur-carbon composite having the sulfur supported on inner pores, surface pores and surface of the holey TE-rGO.

In acetonitrile, the sulfur-carbon composite, a conductor and a binder were mixed using a ball mill to prepare positive electrode active material slurry. Herein, the sulfur-carbon composite was used as a positive electrode active material, carbon black was used as the conductor, polyethylene oxide (molecular weight 5,000,000 g/mol) was used as the binder, and the mixing ratio was employed as sulfur-carbon composite:conductor:binder=90:5:5. The positive electrode active material slurry was coated on an aluminum current collector, and then dried to prepare a positive electrode.

Herein, the loading amount of the positive electrode active material was 5 $mAh/cm^2$ or less, and the loading amount of the sulfur was 6.7 $mg/cm^2$.

A lithium metal thin film having a thickness of 40 μm was used as a negative electrode.

The prepared positive electrode and the negative electrode were placed to face each other, and after providing a polyethylene separator therebetween, an electrolyte liquid was injected thereto to manufacture a coin-type lithium-sulfur battery.

As the electrolyte liquid, a mixed solution obtained by dissolving 1 M LiFSI and 1 wt % of LiNO$_3$ in 1,3-dioxolane (DOL):diethylene glycol dimethyl ether (DEGDME)=4:6 (v/v) was used.

Comparative Example 2

A lithium-sulfur battery of Comparative Example 2 was manufactured in the same manner as in Example 3 except that the TE-rGO of Comparative Example 1 was used instead of the holey TE-rGO of Example 1.

Figure 4:
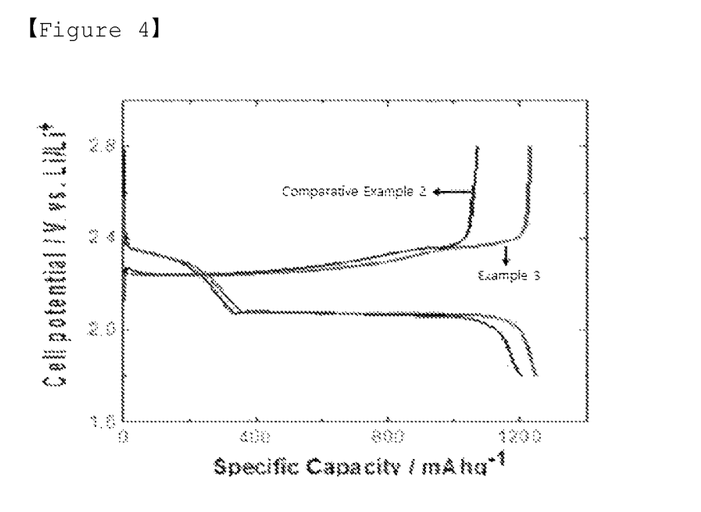
FIG. 4 is a graph measuring initial discharge capacity of Experimental Example 3.

Experimental Example 3. Measurement of Initial Discharge Capacity and Lifetime Properties of Lithium-Sulfur Battery 3-1. Measurement of Initial Discharge Capacity For the lithium-sulfur batteries manufactured in Example 3 and Comparative Example 2, changes in the charge and discharge properties were tested using a charge and discharge measuring device. For the obtained batteries, initial capacity was examined under a 0.1 C/0.1 C charge/discharge, and the results are shown in FIG. 4.

Initial discharge capacity of the lithium-sulfur battery of Example 3 was greater than 1200 mAh/g, and initial discharge capacity of the lithium-sulfur battery of Comparative Example 2 was less than 1200 mAh/g.

In the lithium-sulfur battery of Example 3, the carbon material of the sulfur-carbon composite, a positive electrode active material, was the holey TE-rGO of Example 1, and it was seen that by including pores on the surface, the holey TE-rGO had high specific surface area and pore volume as measured in Experimental Example 2, and thereby contributed to enhancement in the sulfur reactivity by evenly supporting a large amount of sulfur, and as a result, initial discharge capacity was very high.

On the other hand, in the lithium-sulfur battery of Comparative Example 2, the carbon material of the sulfur-carbon composite, a positive electrode active material, was the TE-rGO of Comparative Example 1, and by the TE-rGO not including pores having an average size of 0.5 nm to 4 nm on the surface as measured in Experimental Example 1, and having very small specific surface area and pore volume compared to the holey TE-rGO of Example 1 as measured in Experimental Example 2, the TE-rGO was not able to evenly support as much sulfur as the holey TE-rGO, and as a result, lower initial discharge capacity was observed compared to Example 3.

Accordingly, by using the holey TE-rGO having very high specific surface area and pore volume as the carbon material of the sulfur-carbon composite, a positive electrode active material, the lithium-sulfur battery of the present invention was capable of evenly supporting a larger amount of sulfur, and as a result, high initial discharge capacity was obtained by increasing sulfur reactivity.

3-2. Measurement of Lifetime Properties

Figure 5:
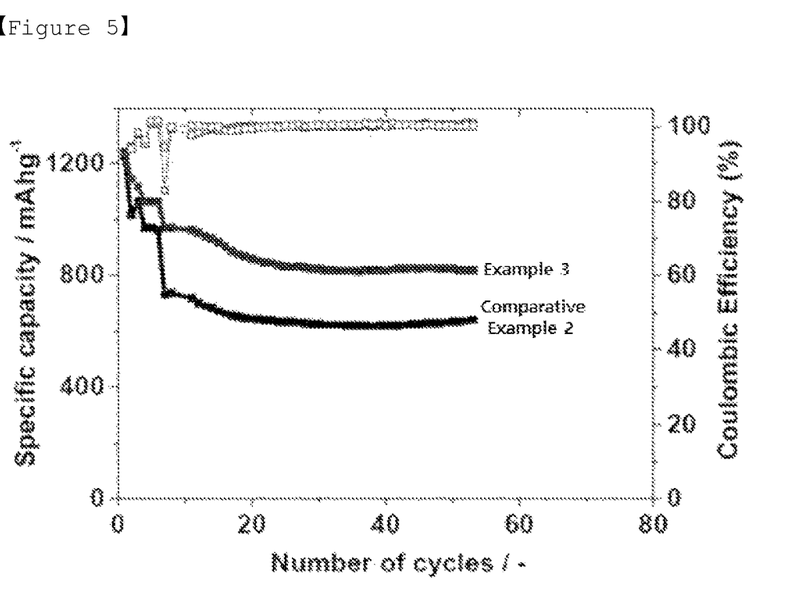
FIG. 5 is a graph measuring battery lifetime properties of Experimental Example 3.

For the lithium-sulfur batteries manufactured in Example 3 and Comparative Example 2, lifetime properties were measured by repeating 50 cycles of charge and discharge employing 0.1 C/0.1 C charge/discharge for the first 3 cycles, 0.2 C/0.2 C charge/discharge for the next 3 cycles, and 0.3 C/0.5 C charge/discharge thereafter using a charge and discharge measuring device, and the results are shown in FIG. 5.

In the lithium-sulfur battery of Example 3, discharge capacity was greater than 800 mAh/g in a high rate section of 0.5 C, and a phenomenon of incomplete charge was not observed during the 50 cycles.

In the lithium-sulfur battery of Comparative Example 2 on the other hand, discharge capacity was 600 mAh/g or less in a high rate section of 0.5 C, and a phenomenon of incomplete charge was observed during the approximate 50 cycles.

Accordingly, by the lithium-sulfur battery of the present invention including the holey thermally expanded-reduced graphene oxide including 0.5 nm to 4 nm size pores on the surface as the carbon material of the sulfur-carbon composite, a positive electrode active material, enhanced discharge capacity in a high rate section was able to be obtained by enhancing a lithium ion transport ability.

In addition, it was identified that, by having high specific surface area and pore volume, a larger amount of sulfur was evenly supported, and enhanced lifetime properties were able to be obtained by increasing sulfur reactivity.

The invention claimed is:

1. A holey thermally expanded-reduced graphene oxide,
   wherein the holey thermally expanded-reduced graphene oxide comprises pores on a surface thereof,
   wherein the pores on the surface have an average size of 0.5 nm to 4 nm,
   wherein the holey thermally expanded-reduced graphene oxide further comprises pores on an inside thereof,
   wherein the holey thermally expanded-reduced graphene oxide has a specific surface area of 1000 m$^2$/g to 2500 m$^2$/g, and
   wherein the holey thermally expanded-reduced graphene oxide has a pore volume of 7 cm$^3$/g to 12 cm$^3$/g.

2. The holey thermally expanded-reduced graphene oxide of claim 1, wherein the holey thermally expanded-reduced graphene oxide has a crumpled paper structure.

3. A method for preparing holey thermally expanded-reduced graphene oxide comprising pores on a surface thereof, the method comprising:
   (a) thermally expanding graphene oxide by heat treatment to produce thermally expanded graphene oxide;
   (b) reducing the thermally expanded graphene oxide by heat treatment to produce a thermally expanded-reduced graphene oxide; and
   (c) forming the pores on the surface of the thermally expanded-reduced graphene oxide by steam activating the thermally expanded-reduced graphene oxide.

4. The method for preparing holey thermally expanded-reduced graphene oxide of claim 3, wherein the graphene oxide in (a) is in a form of a powder.

5. The method for preparing holey thermally expanded-reduced graphene oxide of claim 3, wherein the heat treatment in (a) is conducted for 5 minutes to 30 minutes at a temperature of 300° C. to 500° C.

6. The method for preparing holey thermally expanded-reduced graphene oxide of claim 3, wherein the heat treatment in (b) is conducted for 1 hour to 5 hours at a temperature of 700° C. to 1200° C.

7. The method for preparing holey thermally expanded-reduced graphene oxide of claim 3, wherein the steam activation in (c) is conducted for 30 minutes to 3 hours at a temperature of 500° C. to 1000° C.

8. The method for preparing holey thermally expanded-reduced graphene oxide of claim 3, wherein the holey thermally expanded-reduced graphene oxide comprising pores on the surface has an average surface pore size of 0.5 nm to 4 nm.

9. The method for preparing holey thermally expanded-reduced graphene oxide of claim 8, wherein the holey thermally expanded-reduced graphene oxide comprising pores on the surface has a specific surface area of 500 $m^2/g$ to 2500 $m^2/g$.

10. The method for preparing holey thermally expanded-reduced graphene oxide of claim 8, wherein the holey thermally expanded-reduced graphene oxide comprising pores on the surface has a pore volume of 3 $cm^3/g$ to 12 $cm^3/g$.

11. A sulfur-carbon composite comprising:
the holey thermally expanded-reduced graphene oxide comprising pores on the surface of claim 1; and
sulfur on at least a part of the surface pores, inner pores and surface of the holey thermally expanded-reduced graphene oxide comprising pores on the surface.

12. A lithium secondary battery comprising:
a positive electrode;
a negative electrode;
a separator interposed between the positive electrode and the negative electrode; and
an electrolyte liquid,
wherein the positive electrode includes the sulfur-carbon composite of claim 11.

13. The lithium secondary battery of claim 12, wherein a loading amount of sulfur of the positive electrode is from 2 $mg/cm^2$ to 15 $mg/cm^2$.

14. The lithium secondary battery of claim 12, which is a lithium-sulfur battery.

* * * * *